United States Patent
Somerville (10) Patent No.: US 7,881,420 B2
(45) Date of Patent: Feb. 1, 2011

(54) METHOD AND APPARATUS FOR REDUCING VIBRATION IN COMPONENT OF A NUCLEAR REACTOR

(75) Inventor: Daniel Verne Somerville, Santa Cruz, CA (US)

(73) Assignee: General Electric Company, Schenectady, NY (US)

(*) Notice: Subject to any disclaimer, the term of this patent is extended or adjusted under 35 U.S.C. 154(b) by 79 days.

(21) Appl. No.: 10/860,285

(22) Filed: Jun. 4, 2004

(65) Prior Publication Data

US 2005/0271182 A1    Dec. 8, 2005

(51) Int. Cl.
G21C 9/00 (2006.01)
G21C 19/00 (2006.01)
F16F 15/023 (2006.01)
F16F 15/04 (2006.01)
F16F 15/06 (2006.01)

(52) U.S. Cl. .......... 376/277; 248/638; 188/378; 376/260

(58) Field of Classification Search .......... 376/277; 248/638
See application file for complete search history.

(56) References Cited

U.S. PATENT DOCUMENTS

| | | | | |
|---|---|---|---|---|
| 2,093,930 A | * | 9/1937 | Rosenzweig | 248/619 |
| 4,057,468 A | * | 11/1977 | Lunt | 376/434 |
| 4,789,023 A | * | 12/1988 | Grant | 165/104.26 |
| 4,807,840 A | | 2/1989 | Baker et al. | |
| 4,938,662 A | * | 7/1990 | Shimoyashiki et al. | 415/214.1 |
| 5,427,362 A | * | 6/1995 | Schilling et al. | 267/140.14 |
| 5,600,689 A | | 2/1997 | Weems et al. | |
| 6,193,282 B1 | * | 2/2001 | Assenheimer | 285/115 |
| 6,327,024 B1 | * | 12/2001 | Hayashi et al. | 355/53 |
| 2003/0029393 A1 | * | 2/2003 | Komorowski | 123/41.44 |
| 2003/0172714 A1 | * | 9/2003 | Maeno | 73/12.01 |

FOREIGN PATENT DOCUMENTS

| | | |
|---|---|---|
| DE | 2240761 | 3/1973 |
| EP | 0055678 | 12/1981 |
| FR | 2 721 746 A1 * | 12/1995 |
| GB | 1322807 | 11/1970 |
| GB | 1509223 | 5/1978 |
| JP | GB 2074695 A * | 11/1981 |
| SU | 1120129 A * | 10/1984 |

(Continued)

OTHER PUBLICATIONS

C.F. Beards, "Structural Vibration: Analysis and Damping", Elsevier (1996), pp. 31-35 and 45-49; Electronic ISBN: 1-59124-245-2 (see also Knovel website address http://www.knovel.com/knovel2/Toc.jsp?BookID=490.*

(Continued)

Primary Examiner—Johannes P Mondt
(74) Attorney, Agent, or Firm—Harness, Dickey & Pierce, P.L.C.

(57) ABSTRACT

A vibration mitigation apparatus and method of reducing vibration in a reactor component are described, which may reduce the amplitude of vibration in the reactor component. The apparatus may be provided on the reactor component to reduce the amplitude of vibration of the component as the component and apparatus are subjected to a harmonic excitation that generally may occur during reactor operations.

5 Claims, 5 Drawing Sheets

FOREIGN PATENT DOCUMENTS

| WO | WO 94/02755 | 2/1994 |
|----|-------------|--------|
| WO | WO 98/42998 | 10/1998 |

OTHER PUBLICATIONS

Translation by USPTO Translation Section of G. Barbe, "Dispositif amortisseur des vibrations d'une machine ou construction" (EP 0 055 678 A1) as cited and made of record in the office action.*

Y.S. Chiong, "Viscosity of Liquid Sodium and Potassium", Proceedings of the Royal Society of London, Series A, Mathematical and Physical Sciences, vol. 157, No. 891 (Nov. 2, 1936), pp. 264-277. (from JSTOR archives).*

Swedish Search Report dated Feb. 1, 2006 (w/ English Translation).

English Translation of Office Action for German patent application No. 10-2005-025836.0-54 dated Oct. 16, 2008.

English-language translation of Office Action for German patent application No. 10- 2005-025836.0-54 dated Oct. 16, 2008.

English translation for "Schwingungstilger," (oscillation extinguisher, tuned mass damper), found on the internet on Oct. 9, 2008, at http:/de.wikipedia.org/wiki/schwingungstilger.

* cited by examiner

METHOD AND APPARATUS FOR REDUCING VIBRATION IN COMPONENT OF A NUCLEAR REACTOR

BACKGROUND OF THE INVENTION

1. Field of the Invention

This invention relates generally to an apparatus and method for reducing vibration in a component of a nuclear reactor.

2. Description of the Related Art

A reactor pressure vessel (RPV) of a boiling water reactor (BWR) typically has a generally cylindrical shape and may be closed at both ends, e.g., by a bottom head and a removable top head. A top guide typically may be spaced above a core plate within the RPV. A core shroud, or shroud, typically surrounds the core and may be supported by a shroud support structure.

Figure 1:
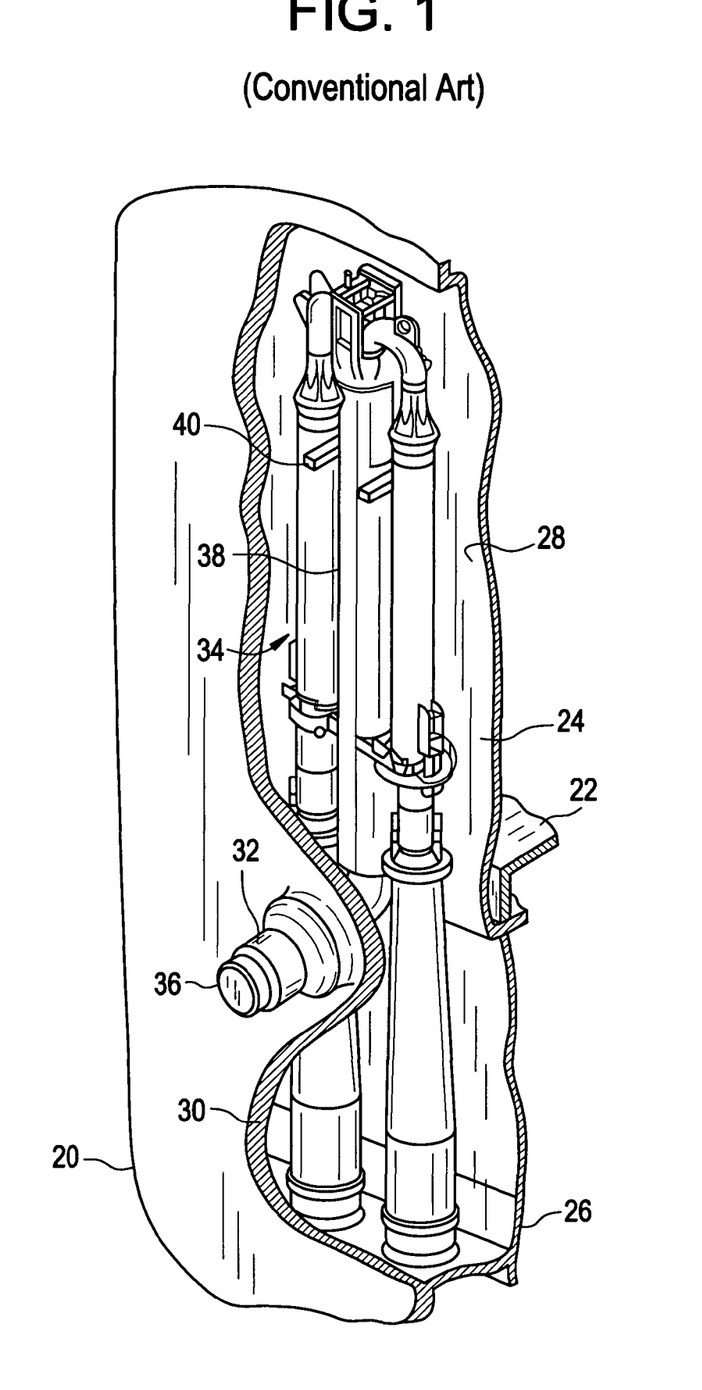
FIG. 1 is a schematic, partial cross-sectional view, with parts cut away, of a conventional reactor pressure vessel of a boiling water nuclear reactor.

FIG. 1 is a schematic, partial cross sectional view, with parts cut away, of a reactor pressure vessel (RPV) 20 for a boiling water reactor. RPV 20 has a generally cylindrical-shape and may be closed at one end by a bottom head and at its other end by removable top head (not shown). RPV 20 may be filled with a reactor coolant fluid (not shown). A top guide (not shown) may be situated above a core plate 22 within RPV 20. A shroud 24 surrounds core plate 22 and may be supported by a shroud support structure 26. A downcomer annulus 28 may be formed between shroud 24 and sidewall 30 of RPV 20.

An annulet nozzle 32 extends through sidewall 30 of RPV 20 and may be coupled to a jet pump assembly 34. Jet pump assembly 34 may include a thermal sleeve 36 which extends through nozzle 32, a lower elbow (only partially visible in FIG. 1), and a riser pipe 38. Thermal sleeve 36 may be secured at a first end (not shown) to a second end of the lower elbow. The first end of thermal sleeve 36 may be welded to the second end of the lower elbow. A first end of the lower elbow similarly secured, or welded, to one end of riser pipe 38. Riser pipe 38 extends between and substantially parallel to shroud 24 and sidewall 30. A riser brace assembly 40 stabilizes riser pipe 38 within RPV 20. The riser brace assembly 40 may be fabricated of type 304 stainless steel which, after periods of use, may be susceptible to cracking at welded joints. The riser brace assembly 40 may be connected between riser pipe 38 and sidewall 30.

BWRs have emerged as a reliable type of nuclear reactor for producing electrical energy. However, some BWRs have experienced cracking in various components of the BWR. One contributing factor to component cracking in a BWR may be due to high cycle fatigue. Typically, a BWR may operate from about one to two years on a single core loading of fuel. Upon completion of a given period (known as an energy cycle or fuel cycle), approximately ¼ to ½ of the least reactive fuel (oldest or most burnt) may be discharged from the reactor. The number of cycles which may constitute a substantially high number of cycles may vary from BWR to BWR, as other factors may affect cycle time, such as design, operating conditions, etc.

High cycle fatigue may be caused, for example, by a substantially high acoustic frequency, for example a frequency above 100 Hz, and/or a substantially low frequency vibration, for example a frequency below 100 Hz. It should be understood that the frequency which constitutes a high and/or a low acoustic frequency may vary based on the application. The amplitude of a vibration in a BWR may directly influence or exacerbate high cycle fatigue, which in turn may cause the cracking of a component of the BWR. The amplitude of the vibration in the BWR experienced by a component of the BWR may be directly proportional to the stress in the component. High amplitude of the vibration in the BWR may lead to a high stress level, which may cause the cracking of a component of the BWR.

Figure 2:
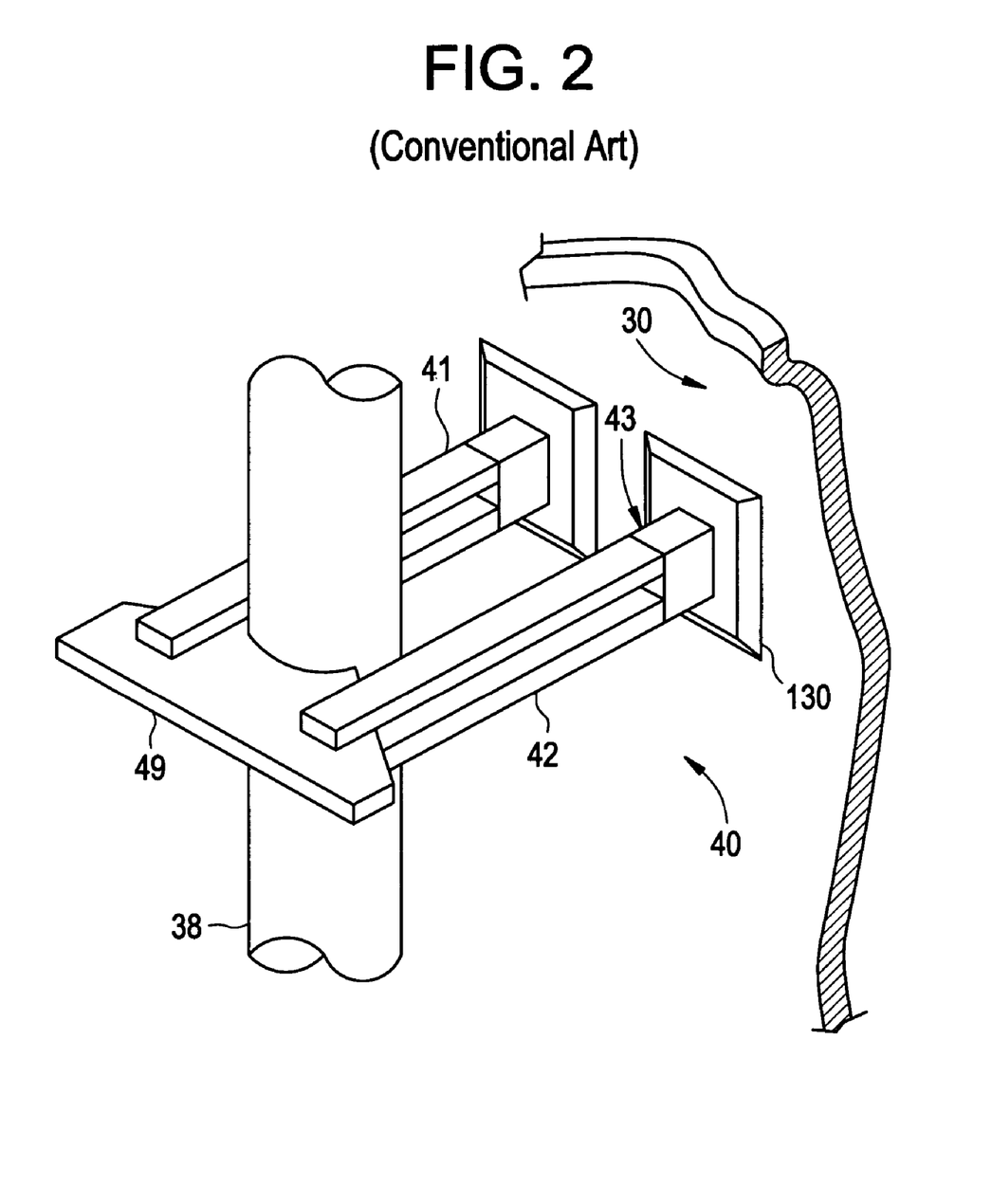
FIG. 2 is a detailed view of a conventional riser brace assembly.

FIG. 2 is a detailed view of a conventional riser brace assembly. Riser brace assembly 40 primarily provides lateral support to the jet pump assembly 34 via riser pipe 38, and includes a riser brace block 43 and two riser brace leaves, an upper riser brace leaf 41 and a lower riser brace leaf 42. Leaves 41 and 42 are attached to riser brace block 43 by welds, and riser brace block 43 may be welded to a support pad 130 which in turn may be affixed to RPV sidewall 30. At the other end, leaves 41 and 42 of the riser brace assembly 40 are connected to a yoke such as brace plate 49. Brace plate 49 in turn may be welded to the riser pipe 38.

The riser brace assembly 40 may be designed to accommodate differential thermal expansion resulting from reactor start-up and heat-up, and to accommodate the flow-induced vibration that may be incumbent in the reactor water recirculation system (not shown) due to the reactor recirculation pumps. Accordingly, a concern with the riser brace assembly 40 is that the natural frequency of the riser brace assembly 40 be greater than the vane passing frequency of the recirculation pumps at any pump speed. If the vane passing frequency of the recirculation pumps equals or exceeds the natural frequency of the riser brace assembly 40, the riser brace assembly 40 may experience resonance, as the amplitude of the vibration increases. A substantially high amplitude of the vibration frequency in the riser brace assembly 40 may lead to high stress levels at the leaves 41 and 42 and/or at welds between leaves 41/42 and block 43 and/or sidewall 30, which may cause cracking at one or more locations in the riser brace assembly 40. A vibrating and/or crack-damaged riser brace assembly 40 could potentially cause the riser pipe 38 to become unstable, adversely affecting the jet pump assembly 34.

SUMMARY OF THE INVENTION

An exemplary embodiment of the present invention is directed to an apparatus configured for operative attachment to a component of a nuclear reactor for mitigating vibration in the component. The apparatus may include a spring mechanism, a mass attached to the spring mechanism and a viscous damping medium. The spring mechanism, mass and viscous damping medium may be configured to reduce vibration effects in the component.

Another exemplary embodiment of the present invention is directed to a method of reducing vibration in a component of a nuclear reactor. A device configured to reduce vibration effects in the component may be attached to the component. Due to the addition of the device to the component, damped natural frequencies may be generated which are above and below an original natural vibration frequency of the component.

Another exemplary embodiment of the present invention is directed to an apparatus configured for operative attachment to a component of a nuclear reactor for mitigating vibration in the component. The apparatus may include a first plate for engaging a first surface of the component, a second plate for engaging a second surface of the component, and a vibration mitigation device connected to the first plate to introduce a damping function for reducing vibration in the component.

BRIEF DESCRIPTION OF THE DRAWINGS

The exemplary embodiments of the present invention will become more fully understood from the detailed description given herein below and the accompanying drawings, wherein like elements are represented by like reference numerals, which are given by way of illustration only and thus are not limiting of the exemplary embodiments of the present invention.

DETAILED DESCRIPTION OF THE EXEMPLARY EMBODIMENTS

Figure 3:
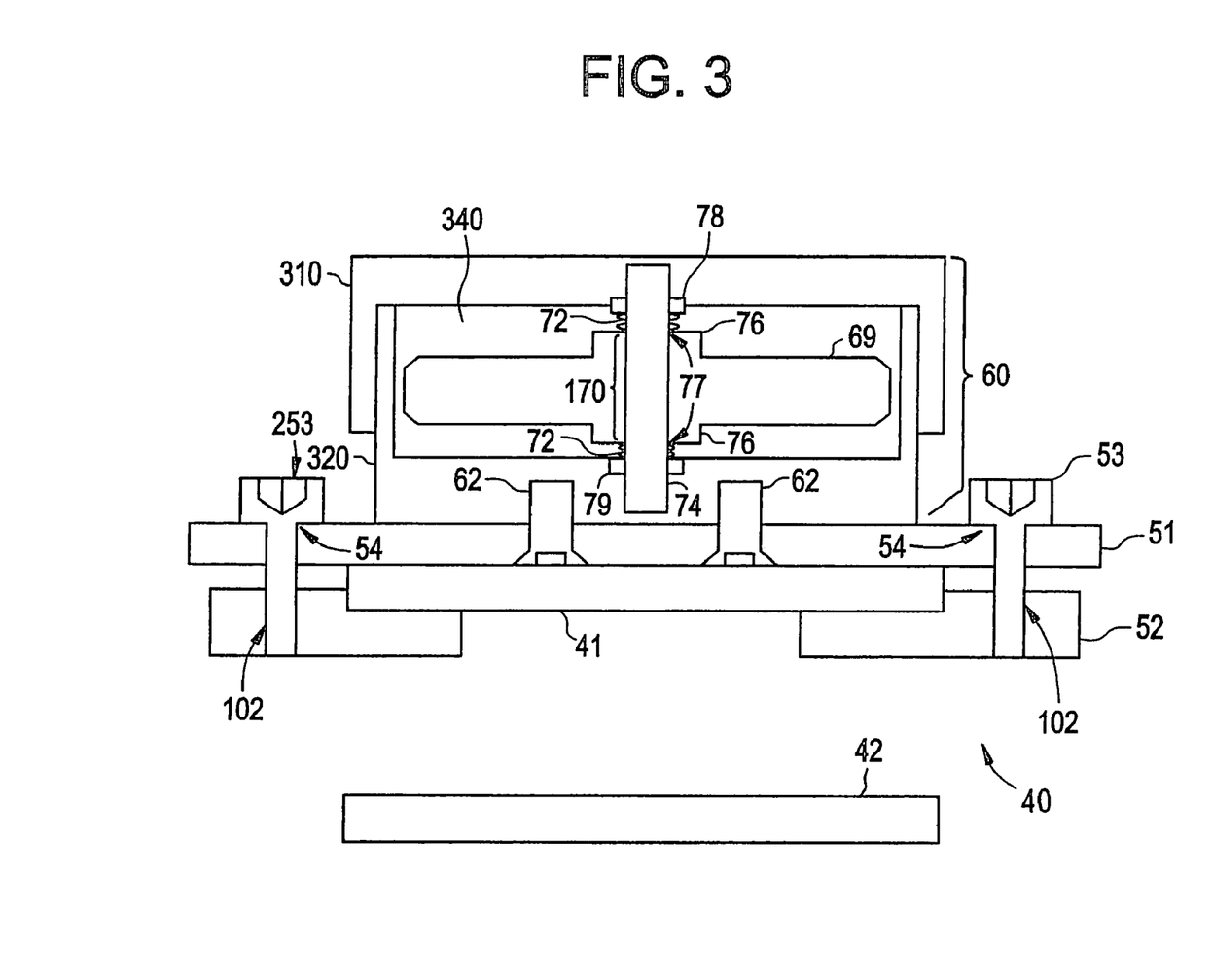
FIG. 3 is an exemplary isometric view of a vibration mitigation apparatus in accordance with an exemplary embodiment of the invention.

FIG. 3 is an exemplary isometric view of a vibration mitigation apparatus in accordance with an exemplary embodiment of the invention. In FIG. 3, a vibration mitigation apparatus 60, hereafter 'apparatus 60', is shown in connective engagement with a reactor component of a nuclear reactor, here shown as a riser brace assembly 40. It should be understood that a riser race assembly 40 is merely an exemplary component of a nuclear reactor; apparatus 60 may be configured for engagement to other component structures within the RPV 20.

Generally, apparatus 60 may be adapted for a reactor component to reduce the amplitude of vibration in the reactor component. For example, apparatus 60 may be provided on the riser brace assembly 40 to reduce the amplitude of vibration of the riser brace assembly 40 when subjected to the harmonic acoustic excitation of a reactor recirculation pump vane passing frequency. Apparatus 60 may substantially reduce the amplitude of vibration in the riser brace assembly over a range vane passing frequencies which may be expected during reactor operation. This may be affected in part by installing a secondary spring and mass system with substantial viscous damping properties on the riser brace assembly 40.

Apparatus 60 may also introduce two new damped natural frequencies which may be spaced above and below the original natural frequency of vibration of the reactor component (i.e., the original vibration in the reactor component without the apparatus 60). As will be seen in further detail below, a structural response at the original natural frequency which was initially in resonance with the excitation frequency may become substantially reduced. Accordingly, apparatus 60 may be designed so that the structural response is beneath a given amplitude across a desired frequency bandwidth. Apparatus 60 may thus be related to a class of damping devices known as "tuned mass dampers".

In general, apparatus 60 may include a secondary mass, a spring and a viscous damper which may be used to adjust or influence the vibration characteristics of a reactor component such as a riser brace assembly 40. For example, a secondary mass and a viscous damper (which may be embodied as a fluid) may interact in such a way so as to reduce the vibration amplitude of the riser brace assembly 40 during harmonic excitation (i.e., vibration events occurring during reactor operation which are translated to reactor components such as the riser brace assembly 40). As will be seen below, apparatus 60 may be mounted to a reactor component such as a riser brace assembly 40 during a refueling outage, and may be left in place for the duration of the operational life of the reactor plant.

In an aspect, apparatus 60 may be adapted for connective engagement with components that are typically submerged in reactor coolant during reactor operation. Thus, apparatus 60 may utilize the reactor coolant within the RPV 20 as the viscous fluid which may provide a damping function through shear deformation. Apparatus 60 may be seal-free, i.e., apparatus 60 may not require any seals to prevent leakage, thereby simplifying design. Apparatus 60 may be attached and removed from a reactor component without requiring a permanent modification to the reactor component.

Apparatus 60 may be designed in accordance with the principles of known tuned mass damper technologies. Reactor coolant, in addition to the secondary mass, may be used to provide viscous damping generated by the shear deformation of the fluid contained within the apparatus 60. As the apparatus 60 is submerged in the reactor coolant and uses the reactor coolant as the viscous fluid, problems of fluid leakage become obsolete. Accordingly, system design may be simplified by removing considerations associated with seals intended to prevent transfer of the damping fluid out of the apparatus 60, or to prevent transfer of reactor coolant into apparatus 60.

As will be shown below, the secondary mass and spring addition to the riser brace assembly 40 may alter the vibration characteristics of the riser brace assembly 40. The modified vibration characteristics may thus exhibit a different structural of natural frequencies than the natural frequency of the riser brace assembly 40. A designer may thus modify one or more of the dimensions of the mass, spring, and/or enclosure to control the frequency response of a reactor component configured with apparatus 60.

Referring now to FIG. 3, apparatus 60 may include a support mechanism including a top plate 51 and a support plate 52. Top plate 51 and support plate 52 may sandwich a reactor component surface such as the upper riser brace leaf 41 shown in FIG. 2. Top plate 51 and support plate 52 are fixedly clamped onto a component such as a riser brace leaf 41 by a plurality of clamp bolts 53 which thread into the bottom plate 52

The top plate 51 includes holes 54 to receive clamp bolts 53. Top plate 51 is additionally fastened to the apparatus 60 by, for example, a bolt 62. The damping apparatus 60 is shown arranged on a side of top plate 51 opposite the side of the top plate 51 that contacts the riser brace assembly 40 when the clamp apparatus 50 is fastened to the riser brace assembly 40. However, this is merely an exemplary engagement position, as apparatus 60 may be secured at locations other than riser brace assembly 40, and at other locations along riser brace assembly 40.

The clamp bolts 53 may contain external threads at the distal end. The clamp bolts 53 may be seated tight in the support plate 52, such as by using a tool to engage a hexagon socket 253 that may be machined in the proximal end of each clamp bolt 53, for example. The support plate 52 may include threaded openings 102 designed to receive the two clamp bolts 53. In addition, the diameter of the threaded openings 102 may be large enough to allow threading of the distal end of a clamp bolt 53 to the support plate 52 during assembly.

Apparatus 60 may include an outer cover 310, inner cover 320, a damping element 69 (sometimes referred to as a secondary mass), spring elements 72, fluid enclosure 340 containing a viscous fluid (i.e., viscous damper or viscous damping medium), and associated mechanical fasteners and retaining devices. Outer cover 310 may be configured in the shape of a cup with a threaded portion (not shown for clarity) on an inner lip of the outer cover 310 to engage a threaded portion (not shown for clarity) of inner cover 320. An inner central portion of the outer cover 310 may include a circular groove 78 for receiving a first end of a dowel 74 and at least one end of one of the springs 72.

The inner cover 320 may be essentially identical to the outer cover 310, except that the inner cover 320 may be of a smaller diameter than the outer cover 310. In addition, the inner cover may include a threaded portion on an outside lip (not shown for clarity) of the inner cover 320. An inner central portion of the inner cover 320 may also include a circular groove 79 for receiving a second end of the dowel 74 and at least one end of the springs 72. Outer cover 310 and inner cover 320 may be configured in any desired shape, provided that one fits within the other without substantial gaps.

A reactor component (such as the riser brace assembly 40 with clamping apparatus 50) may be submerged in a viscous fluid such as reactor coolant (also known as primary coolant). As discussed above, the connection between outer cover 310 and the inner cover 320 need not be sealed so as to avoid the reactor coolant from entering and exiting.

Damping element 69 (also referred to as a secondary mass) may be a disk shaped device with circular grooves 76 centered on either side and a hole at the damping element's 69 center. Damping element 69 may be shaped such that a small gap exists between the fluid above and below damping element 69, as shown in FIG. 3 for example. Damping may be achieved as the fluid moves between the fluid regions above and below damping element 69.

Springs 72 may be embodied as coil springs, and/or may include a spring force provided by cantilever beams or other elastic device attached to surfaces of the outer cover 310 or inner cover 320, for example. The springs 72 may be positioned so that one end of each of the springs 72 is secured in the circular grooves 76 on either side of the damping element 69, with the dowel 74 passing through each of the springs 72. One end of one of the springs 72 sets in the circular groove 78 of the outer cover 310. One end of the second of the springs 72 sets in the circular groove 76 of the inner cover 320. The dowel 74 fits through the hole 77 of the damping element 69 and passes through the springs 72 such that one end of the dowel 74 sets in the circular groove 78 of the outer cover 310 (which may be considered a first end of the fluid enclosure 340, or alternatively it may be considered a second end of the fluid enclosure 340) and the end of the dowel 74 sets in the circular groove 79 of the inner cover 320 (which may be considered a second end of the fluid enclosure 340, or alternatively it may be considered a first end of the fluid enclosure 340). The dowel 74 is affixed to the first and second ends 310/320 of the fluid enclosure 340 at approximately normal angles with both ends 310/320, causing mass 69 to vibrate at approximately a normal angle with the surfaces of the first and second ends 310/320 of the enclosure 340. The springs 72 may be adjusted for different spring constants, which in turn affects the range of vibration frequencies that clamp apparatus 50 with apparatus 60 may absorb.

The viscous fluid resides within fluid enclosure 340, which may be formed by the engagement of the outer cover 310 and inner cover 320, for example. The viscous fluid may interact with damping element 69 to assist in providing a damping function for a reactor component such as a riser brace assembly 40, via clamp apparatus 50. The viscous fluid in enclosure 340 and the damping element 69 help absorb vibrations generated by the operating reactor as conveyed through the RPV 20 or riser pipe 38 to the riser brace assembly 40. The viscous fluid may deform during a vibration event (in which an excitation frequency is generated which is translated to the riser brace assembly 40) to help dampen the vibration experienced by the damping element 69. The outer cover 310, inner cover 320, damping element 69, springs 72 and the dowel 74 have a natural tendency to remain in alignment and thus may remain properly mated during reactor operations causing vibrations in components such as the riser brace assembly 40.

The damping element 69 may include circular grooves 76 on either side to receive ends of the springs 72 and a circular through hole 170 to receive the dowel 74. The size of the damping element 69 may be modified as necessary to achieve desired vibration frequency characteristics of the reactor component to which apparatus 60 is attached, so as the exemplary riser brace assembly 40. The seating of the springs 72 (on either side of the damping element 69) into the circular grooves may prevent the springs 72 from becoming loose in a flow-induced vibration environment that may be indigenous to the riser brace assembly 40. The dowel 74 additionally may assist in maintaining the springs 72 and the damping element 69 in place.

Damping element 69 may be allowed to float in the viscous fluid within enclosure 340, but may be prevented from rotating, thus acting in conjunction with the spring 72 to control a relative distance between the damping element 69 and the inner cover 320/outer cover 310. The damping element 69 may be held captive by the dowel pin 84, which in turn passes through the oversized through hole 170 to enable the damping element 69 to float, but not to bind with a spring 72.

Accordingly, substantial reduction in dynamic stresses may be achieved by adding vibration mitigation apparatus 60 to the structure of a reactor component, such as to the riser brace assembly 40 shown in FIG. 3, for example. The viscous damping function may be provided by the geometry of the apparatus 60 and the shear deformation of the fluid contained in the fluid enclosure 340 of apparatus 60. As the viscous damping function may be provided by the reactor coolant itself, leakage from apparatus 60 is not detrimental to reactor operation.

Figure 4:
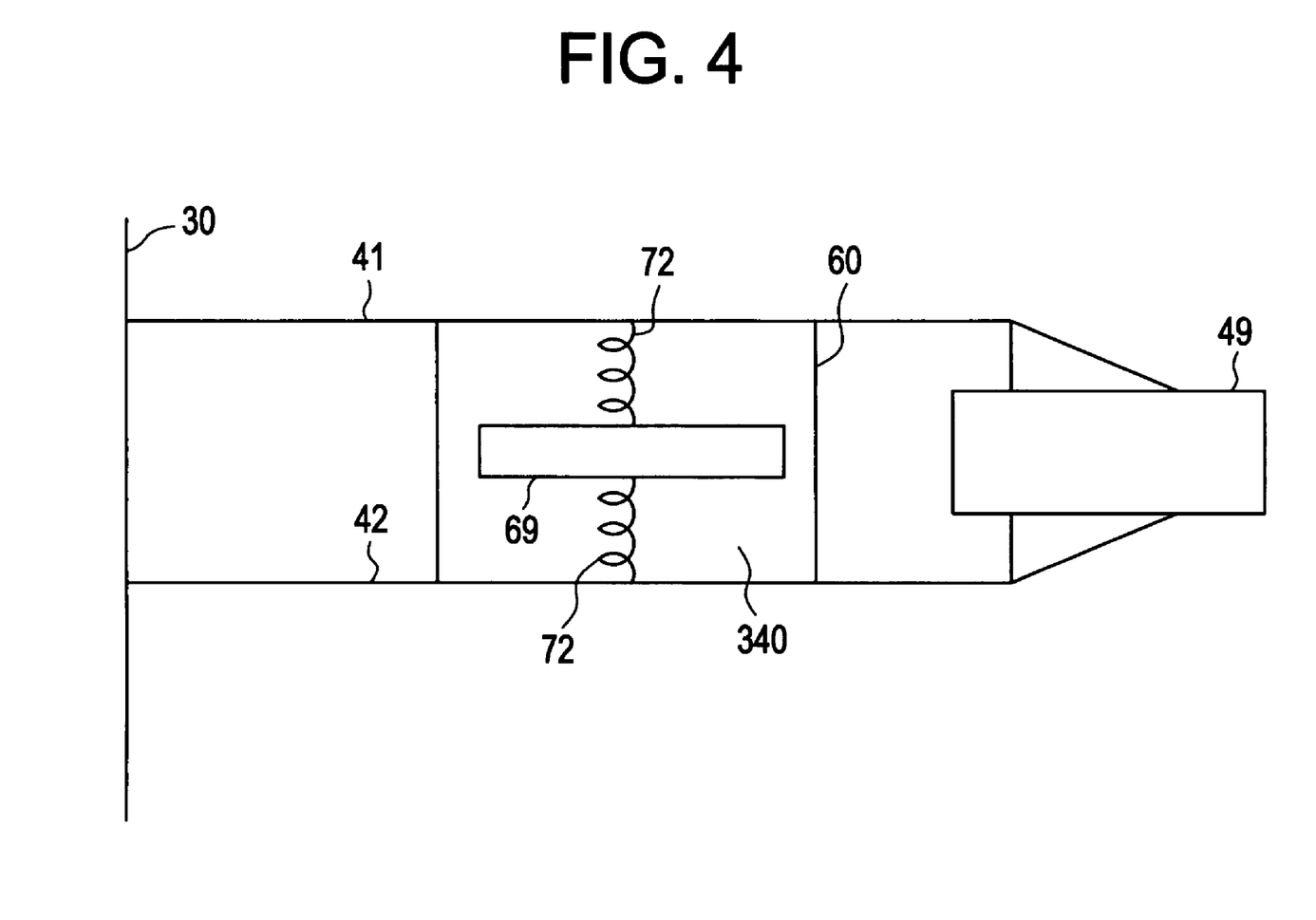
FIG. 4 is an exemplary illustration of an alternate connection of a clamp apparatus within a reactor pressure vessel (RPV) in accordance with an exemplary embodiment of the present invention.

FIG. 4 is an exemplary illustration of a vibration mitigation apparatus 60 in accordance with an exemplary embodiment of the present invention. FIG. 4 is a top view of a portion of the riser brace assembly 40 to illustrate the vibration mitigation apparatus 60 installed between leaves 41 and 42 of the riser brace assembly 40. In FIG. 4, only certain components of the apparatus 60 are shown for purposes of clarity. A top surface of the outer cover 310 may press against a bottom surface of the upper riser brace leaf 41, thereby sandwiching damping apparatus 60 between riser brace leaves 41 and 42. The apparatus 60 may be adjustable, and may be installed so that damping element 69, fluid enclosure 340 and springs 72 are secured between the riser brace leaves 41 and 42, thus filling the space between the leaves 41 and 42, as shown in FIG. 4.

Figure 5:
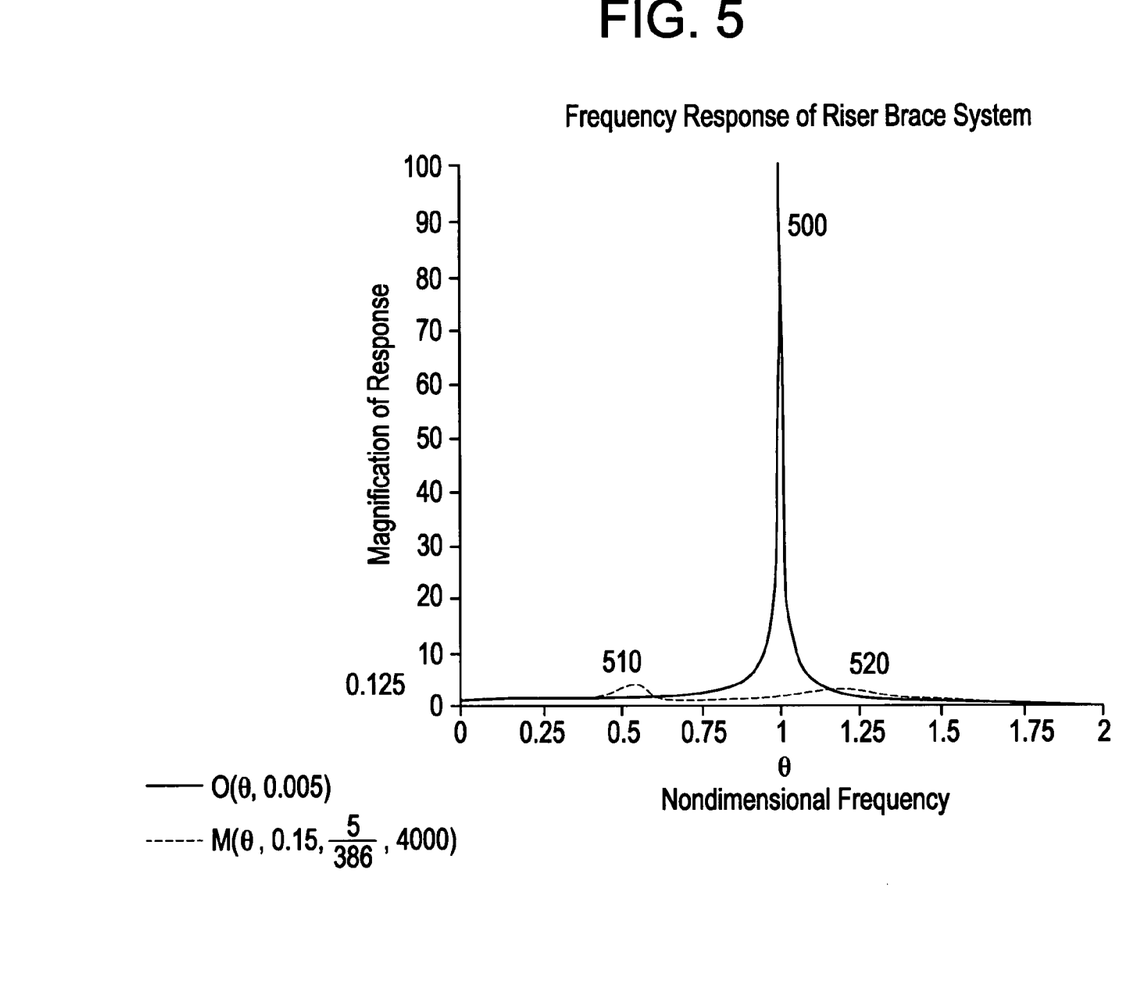
FIG. 5 is a graph for comparing an original natural frequency with damped natural frequencies introduced by the exemplary embodiments of the present invention.

FIG. 5 is a graph for comparing an original natural frequency with damped natural frequencies introduced by the exemplary embodiments of the present invention. The graph shows a non-dimensional frequency as a function of the magnification of frequency response, which represents the vibration frequency response of a nuclear reactor with and without the inclusion of a vibration mitigation apparatus 60.

As shown in FIG. 5, the original natural frequency 500 (shown by solid trace line) has a peak which reaches the top of the scaled x-axis at a frequency represented by "1" on the y-axis. In contrast, the peaks of the two damped natural frequencies 510 and 520 introduced by application of vibration mitigation apparatus 60 to a reactor component (see dotted line traces) may occur at frequencies both above and below the original natural frequency of vibration of the component (riser brace assembly 40), and further at reduced amplitudes, as compared to the amplitude of the original natural frequency 500. Therefore, the amplitude of the original natural frequency 500 has been reduced by addition of the tuned mass damper (i.e., apparatus 60), and the two new damped natural frequencies 510 and 520 have amplitudes lower than the original natural frequency 500, so the maximum amplitude of the frequency response has been reduced for a component to which the vibration mitigation apparatus 60 is attached.

The exemplary embodiments of the present invention may offer several benefits. Apparatus 60 may reduce the vibration amplitude of a reactor component to which it is connected. Apparatus 60 may utilize the reactor coolant as a viscous damping medium, and may be installed during a refueling outage so as to be left installed for the remainder of the reactor life. As apparatus 60 is submerged within the reactor coolant, leakage issues are redundant. Additionally, the reactor coolant water chemistry is unaffected by apparatus 60.

Further, apparatus 60 may be formed of materials such as stainless steel and/or stainless steel alloys that may be suitable in a reactor environment. For example, stainless steel does not experience substantial degradation when exposed to the operating reactor environment, and does not compromise reactor water chemistry. Accordingly, a reactor utilizing apparatus 60 may be operated at core flows that might otherwise cause fatigue failure of reactor components in an unmodified state (i.e., reactor components which do not utilize or are not configured with apparatus 60).

The exemplary embodiments of the present invention being thus described, it will be obvious that the same may be varied in many ways. Such variations are not to be regarded as departure from the spirit and scope of the exemplary embodiments of the present invention, and all such modifications as would be obvious to one skilled in the art are intended to be included within the scope of the following claims.

What is claimed:

1. An apparatus configured for operative attachment to a reactor component of a nuclear reactor for mitigating vibration in the component, the apparatus configured to be immersed in reactor coolant within a pressure vessel of the reactor, the apparatus comprising:
   a first coil spring and a second coil spring;
   a mass having opposing upper and lower surfaces, the upper surface attached to the first coil spring and the lower surface attached to the second coil spring so that the mass is supported within the apparatus between the first and second coil springs; and
   a fluid enclosure housing the coil springs and the mass, the enclosure being unsealed, allowing the reactor coolant to flow in and out of the enclosure and serve as a viscous damping medium;
   the fluid enclosure having a first end and a second end, the first end being attached to the first coil spring and the second end being attached to the second coil spring;
   a dowel affixed to the first end and the second end of the fluid enclosure, at approximately a normal angle with the first end and the second end of the fluid enclosure, and passing through a hole in the mass;
   the first end and the second end of the fluid enclosure being configured to operatively attach to the component to remove vibration energy in the component.

2. The apparatus of claim 1, wherein the first and second coil springs and mass are configured to co-act with each other and the reactor coolant so as to adjust vibration characteristics of the component by introducing a damping function for removing linear vibration energy in the component.

3. The apparatus of claim 1, wherein the fluid enclosure comprises:
   a first cover on the first end of the fluid enclosure; and
   a second cover on the second end of the fluid enclosure, the first and second covers arranged in engaged relation, the first and second covers including a groove for securing one end of the first and second coil springs, respectively, and each upper and lower surface of the mass including a groove for securing said each upper and lower surface to the first and second coil springs, respectively.

4. The apparatus of claim 1, wherein interaction between the mass, the coil springs, reactor coolant and the component during reactor operation introduces damped natural frequencies which are above and below an original natural frequency of the component.

5. The apparatus of claim 4, wherein the damped natural frequencies have amplitudes lower than the original natural frequency so as to reduce a maximum amplitude of the component.

* * * * *